United States Patent
Inoue et al.

(10) Patent No.: US 8,223,521 B2
(45) Date of Patent: Jul. 17, 2012

(54) INVERTER DEVICE

(75) Inventors: Hidetoshi Inoue, Moriguchi (JP); Kenji Nojima, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 110 days.

(21) Appl. No.: 12/866,800

(22) PCT Filed: Mar. 10, 2009

(86) PCT No.: PCT/JP2009/054480
§ 371 (c)(1),
(2), (4) Date: Aug. 9, 2010

(87) PCT Pub. No.: WO2009/113509
PCT Pub. Date: Sep. 17, 2009

(65) Prior Publication Data
US 2010/0320950 A1    Dec. 23, 2010

(30) Foreign Application Priority Data

Mar. 12, 2008    (JP) ................................. 2008-062380
Mar. 3, 2009    (JP) ................................. 2009-048683

(51) Int. Cl.
*H02M 7/521*    (2006.01)
(52) U.S. Cl. .......................................... 363/98; 363/132
(58) Field of Classification Search .................... 363/17, 363/40, 41, 95, 98, 132; 318/807, 811; 324/509, 324/522
See application file for complete search history.

(56) References Cited

U.S. PATENT DOCUMENTS

| | | | |
|---|---|---|---|
| 4,772,996 A * | 9/1988 | Hanei et al. ...................... 363/41 |
| 7,017,377 B2 * | 3/2006 | Hosoito et al. ................ 68/12.16 |
| 7,221,121 B2 * | 5/2007 | Skaug et al. ................... 318/807 |
| 7,471,525 B2 * | 12/2008 | Suzuki et al. .................... 363/37 |
| 7,839,663 B2 * | 11/2010 | Suzuki et al. .................... 363/37 |
| 8,013,612 B2 * | 9/2011 | Morini et al. ................. 324/509 |

(Continued)

FOREIGN PATENT DOCUMENTS

JP        6-351280 A    12/1994
(Continued)

OTHER PUBLICATIONS

International Search Report of PCT/JP2009/054480, Mailing Date of Jun. 2, 2009.

*Primary Examiner* — Adolf Berhane
(74) *Attorney, Agent, or Firm* — Westerman, Hattori, Daniels & Adrian, LLP (57) ABSTRACT

In a 2-shunt system, accurate sensorless vector control can be realized without increasing shunt resistors. There is disclosed an inverter device including an inverter main circuit obtained by connecting, in a three-phase bridge-like manner, three arms formed by coupling, in series with a direct-current power source, two switching elements which perform mutually opposite on/off operations, to apply three-phase pseudo alternating-current voltages of a three-phase PWM system to an electric motor; shunt resistors connected to the direct-current power source in series with at least two of the three arms of the inverter main circuit; and a controller for detecting currents flowing through the shunt resistors in a predetermined cycle to control the on/off operations of the switching elements of the inverter main circuit based on the detected currents. The controller converts, into the current value of a specific angle range, a current value detected at a time before approximately 180° corresponding to the specific angle range where the on-time of the switching elements is continuously not more than a predetermined value, and then uses the converted current value.

2 Claims, 9 Drawing Sheets

U.S. PATENT DOCUMENTS

2007/0189048 A1    8/2007    Goto

FOREIGN PATENT DOCUMENTS

| | | |
|---|---|---|
| JP | 2000-262088 A | 9/2000 |
| JP | 3674578 B2 | 7/2005 |
| JP | 2006-254671 A | 9/2006 |
| JP | 2006-353073 A | 12/2006 |
| JP | 2007-312511 A | 11/2007 |

* cited by examiner

INVERTER DEVICE

BACKGROUND OF THE INVENTION

The present invention relates to an inverter device which controls an electric motor by a sensorless vector system where any magnetic pole position sensor is not used.

Figure 1:
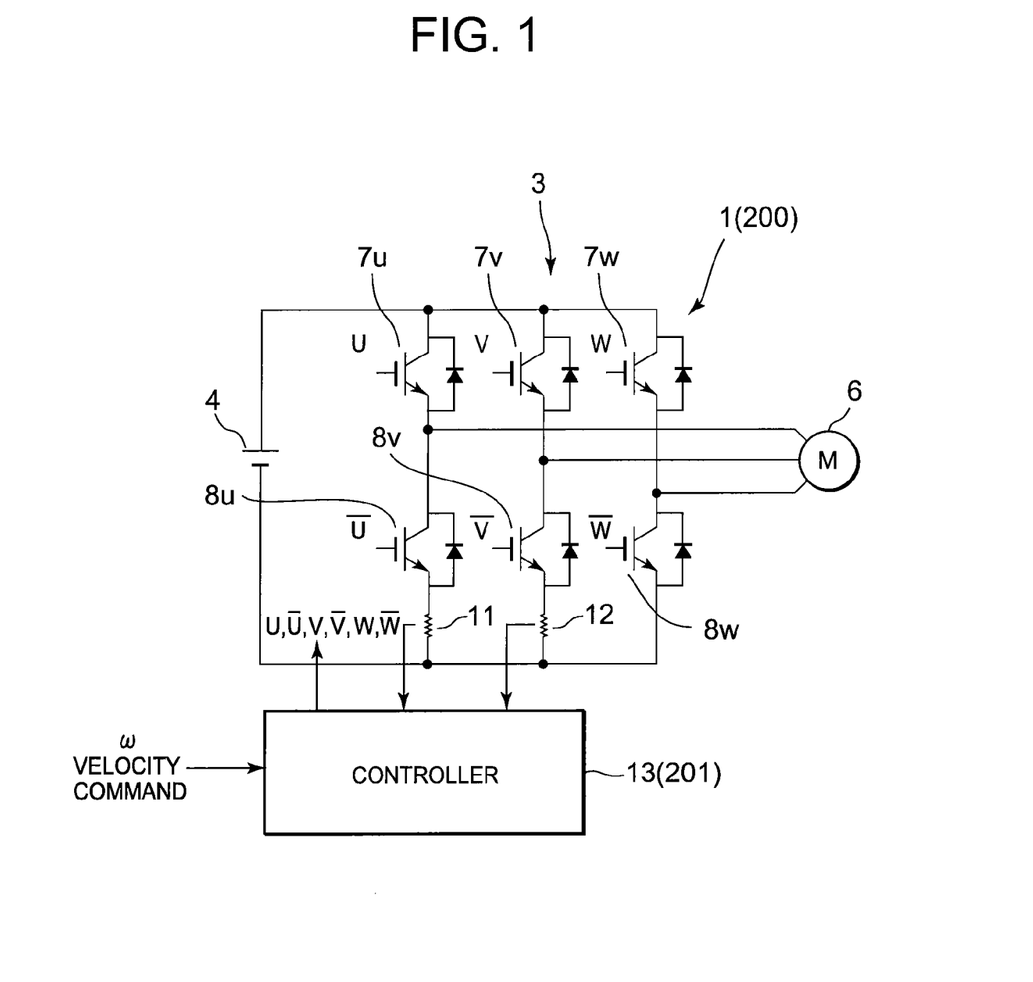
FIG. 1 is a circuit constitution diagram of an inverter device of one embodiment of the present invention.

When a brushless motor (an electric motor) is operated by sensorless vector control, heretofore, a voltage command value, an angular frequency and a phase have heretofore been calculated from a phase current flowing through an inverter main circuit, and a small and inexpensive shunt resistor has been used as a device for detecting this phase current. There are two types of a system using this shunt resistor: in one of them (a 1-shunt system), one shunt resistor is used as shown in FIG. 6 (see, e.g., Patent Document 1); and in the other system (a 2-shunt system), two shunt resistors are used to detect two-phase currents as shown in FIG. 1.

(1-Shunt System)

Figure 6:
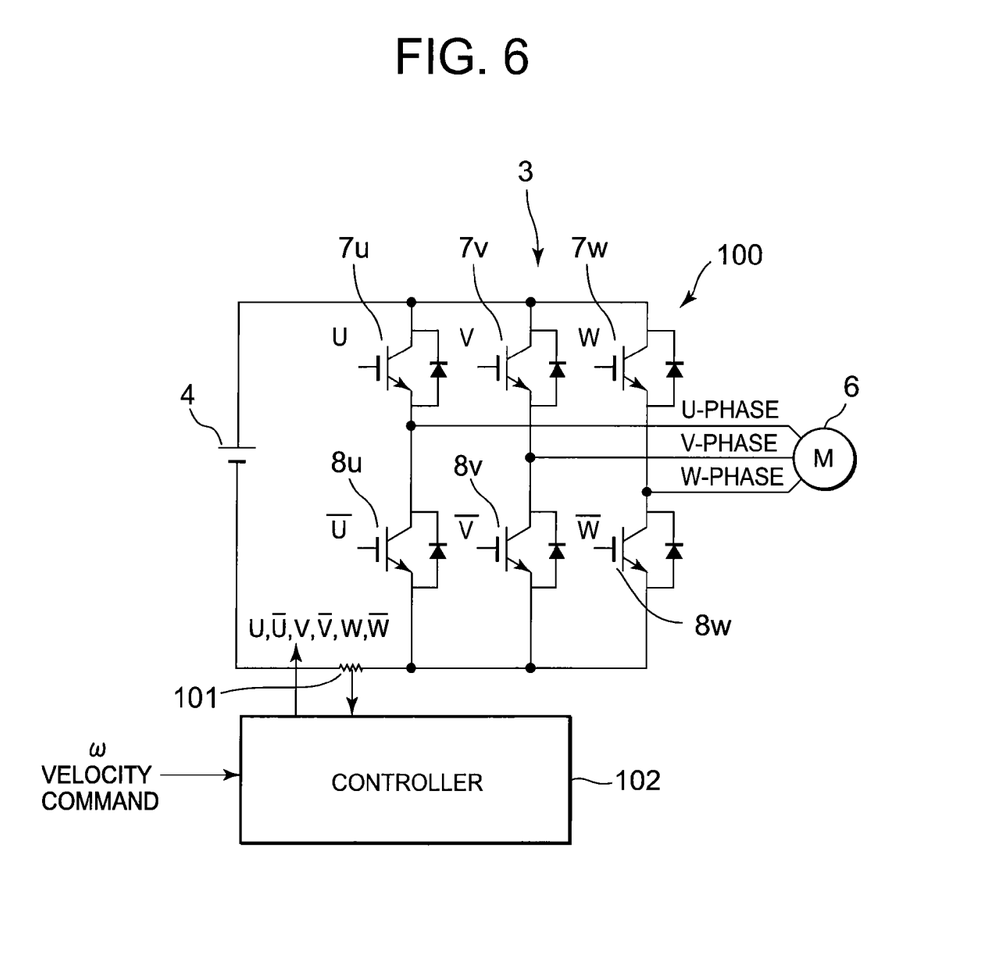
FIG. 6 is a circuit constitution diagram of a conventional inverter device of a 1-shunt system.

FIG. 6 shows a circuit constitution diagram of an inverter device 100 of the former 1-shunt system. Reference numeral 3 is an inverter main circuit of a three-phase pulse width modulation (PWM) system where a voltage supplied from a direct-current power source section 4 is converted into arbitrary variable voltages, e.g., three-phase pseudo alternating-current voltages having a variable frequency, output, and supplied to an electric motor (e.g., a synchronous motor) 6. That is, the inverter main circuit 3 comprises a switching element 7u of an upper arm for a U-phase, a switching element 8u of a lower arm for the U-phase, a switching element 7v of an upper arm for a V-phase, a switching element 8v of a lower arm for the V-phase, a switching element 7w of an upper arm for a W-phase and a switching element 8w of a lower arm for the W-phase, and a diode which allows the return of a current flowing through a winding wire of the electric motor 6 is connected in anti-parallel with each of the switching elements 7u, 8u, 7v, 8v, 7w and 8w.

It is to be noted that in the switching element, an insulated gate bipolar transistor (IGBT) is used (this is similarly used hereinafter).

The switching elements 7u, 8u, 7v, 8v, 7w and 8w turn on when a pulse signal input into a base has an 'H' level, and turn off when the pulse signal has an 'L' level. Moreover, a shunt resistor 101 is connected to a direct-current bus, and the shunt resistor 101 has a constitution through which a direct-current bus current Idc (a shunt current) flows.

A controller 102 distributes the direct-current bus current Idc detected by the shunt resistor 101 to the respective phases based on pulse signals U, Ubar, V, Vbar, W and Wbar output by itself, to estimate three-phase currents flowing through the electric motor 6, i.e., a U-phase current Iu, a V-phase current Iv and a W-phase current Iw.

Figure 7:
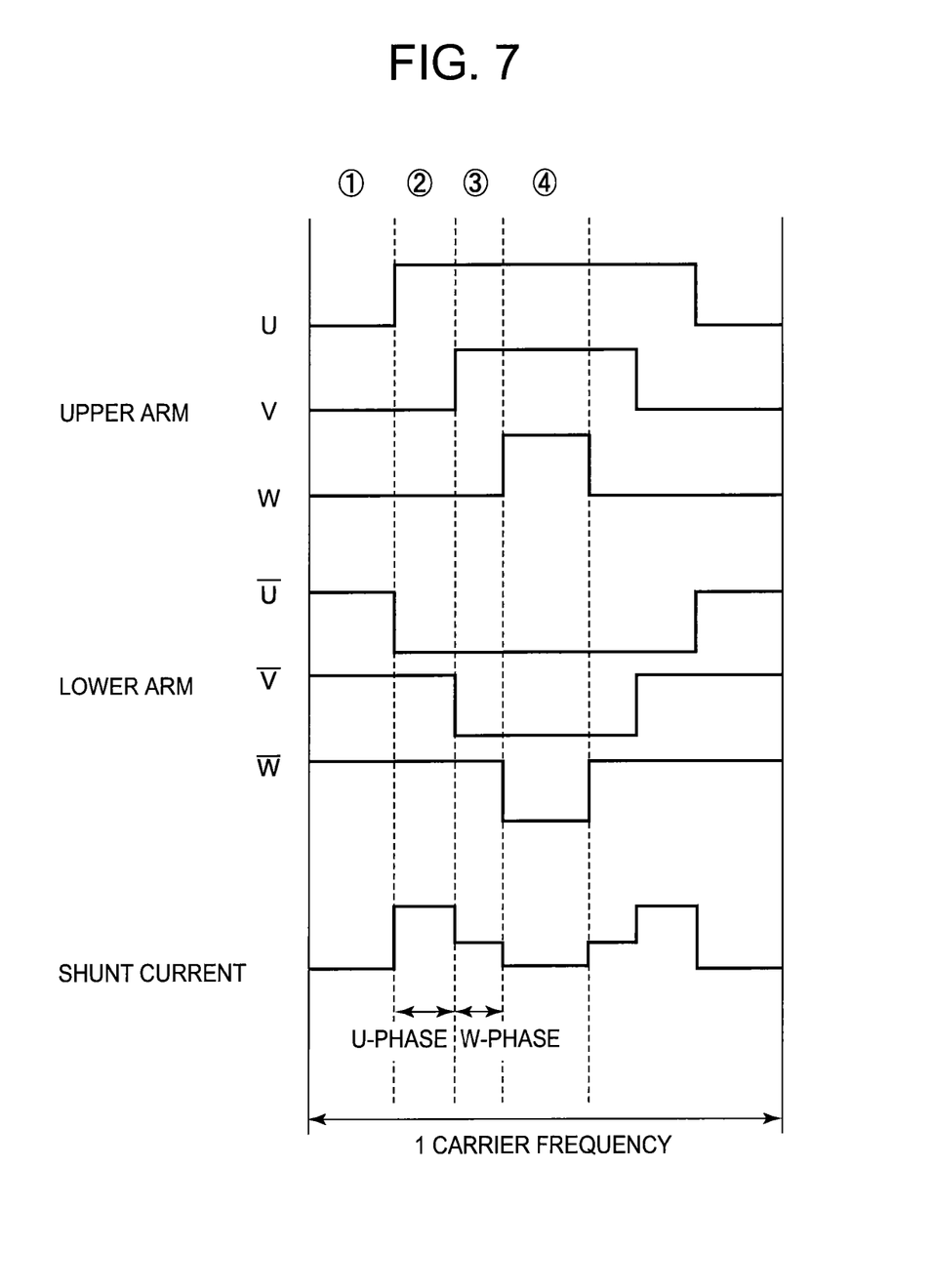
FIG. 7 is a diagram showing the on/off state of each switching element and a direct-current bus current in one carrier frequency of the inverter device of FIG. 6.

FIG. 7 shows the on/off state of each switching element of FIG. 6 and the direct-current bus current Idc (the shunt current) in one cycle (one carrier frequency) of a carrier wave used for the three-phase PWM system of the inverter device 100. For example, the direct-current bus current Idc is detected in the periods of circled 2 and 3 of FIG. 7.

In the period of circled 3, the switching element 7u of the upper arm for the U-phase turns on, the switching element 7v of the upper arm for the V-phase turns on and the switching element 8w of the lower arm for the W-phase turns on, whereby it is estimated that the W-phase current Iw (with a minus sign) is the direct-current bus current Idc detected in the period of circled 3.

In the period of circled 2, the switching element 7u of the upper arm for the U-phase turns on, the switching element 8v of the lower arm for the V-phase turns on, and the switching element 8w of the lower arm for the W-phase turns on, whereby it is estimated that the U-phase current Iu (with a minus sign) is the direct-current bus current Idc detected in the period of circled 2.

Moreover, the sum of the U-phase current Iu, the V-phase current Iv and the W-phase current Iw is zero, and accordingly, the U-phase current Iu is also estimated.

The controller 102 calculates the voltage command value, an estimated angular frequency value and the phase based on the phase of a rotating coordinate system and an angular frequency command value ω (a velocity command) by use of the estimated three-phase currents Iu, Iv and Iw (e.g., processing described in Patent Document 3), converts, into three-phase voltage command values, the voltage command value of the rotating coordinate system among these values, and further subjects the values to pulse width modulation, to output the pulse signals U, Ubar, V, Vbar, W and Wbar which control the switching elements 7u, 8u, 7v, 8v, 7w and 8w, respectively.

(2-Shunt System)

FIG. 1 shows a circuit constitution diagram of an inverter device 200 of the latter 2-shunt system. In the same manner as in the above system, reference numeral 3 is an inverter main circuit of a three-phase pulse width modulation (PWM) system where a voltage supplied from a direct-current power source section 4 is converted into arbitrary variable voltages, e.g., three-phase pseudo alternating-current voltages having a variable frequency, output, and supplied to an electric motor (e.g., a synchronous motor) 6. That is, the inverter main circuit 3 comprises a switching element 7u of an upper arm for a U-phase, a switching element 8u of a lower arm for the U-phase, a switching element 7v of an upper arm for a V-phase, a switching element 8v of a lower arm for the V-phase, a switching element 7w of an upper arm for a W-phase and a switching element 8w of a lower arm for the W-phase, and a diode which allows the return of a current flowing through a winding wire of the electric motor 6 is similarly connected in anti-parallel with each of the switching elements 7u, 8u, 7v, 8v, 7w and 8w.

The switching elements 7u, 8u, 7v, 8v, 7w and 8w similarly turn on when a pulse signal input into a base has an 'H' level, and turn off when the pulse signal has an 'L' level. Moreover, in this case, shunt resistors 11 and 12 are connected to the lower arm for the U-phase and the lower arm for the V-phase, the shunt resistor 11 has a constitution through which a U-phase current Iu flows, and the shunt resistor 12 has a constitution through which a V-phase current Iv flows.

A controller 201 detects the U-phase current Iu from the shunt resistor 11, and detects the V-phase current Iv from the shunt resistor 12. Moreover, as described above, the sum of the U-phase current Iu, the V-phase current Iv and a W-phase current Iw is zero, and accordingly, the W-phase current Iw is estimated.

The controller 201 calculates the voltage command value, an estimated angular frequency value and the phase based on the phase of a rotating coordinate system and an angular frequency command value ω (a velocity command) by use of the detected and estimated three-phase currents Iu, Iv and Iw (the processing described in Patent Document 3), converts, into three-phase voltage command values, the voltage command value of the rotating coordinate system among these values, and further subjects the values to pulse width modulation, to output pulse signals U, Ubar, V, Vbar, W and Wbar which control the switching elements 7u, 8u, 7v, 8v, 7w and 8w, respectively.

Patent Document 1: Japanese Patent Application Laid-Open No. 2007-312511

Patent Document 2: Japanese Patent No. 3674578

Patent Document 3: Japanese Patent Application Laid-Open No. 2000-262088

SUMMARY OF THE INVENTION

Even in either system, the currents of arm phases are obtained to perform sensorless vector control, but in the above 1-shunt system, a region where the on-period of an upper arm comes close, i.e., a region of circled 2 or 3 of FIG. 7 becomes narrower, and ringing (the disturbance of a waveform due to the inductance or reflection of a circuit at a time when a signal rapidly varies) occurs in the current detected by a shunt resistor, whereby a correct current value cannot be detected, and accordingly, the current for one phase can only be detected. Moreover, a problem occurs that a d-q current to be used for the vector control cannot be calculated only from this current for one phase.

Figure 8:
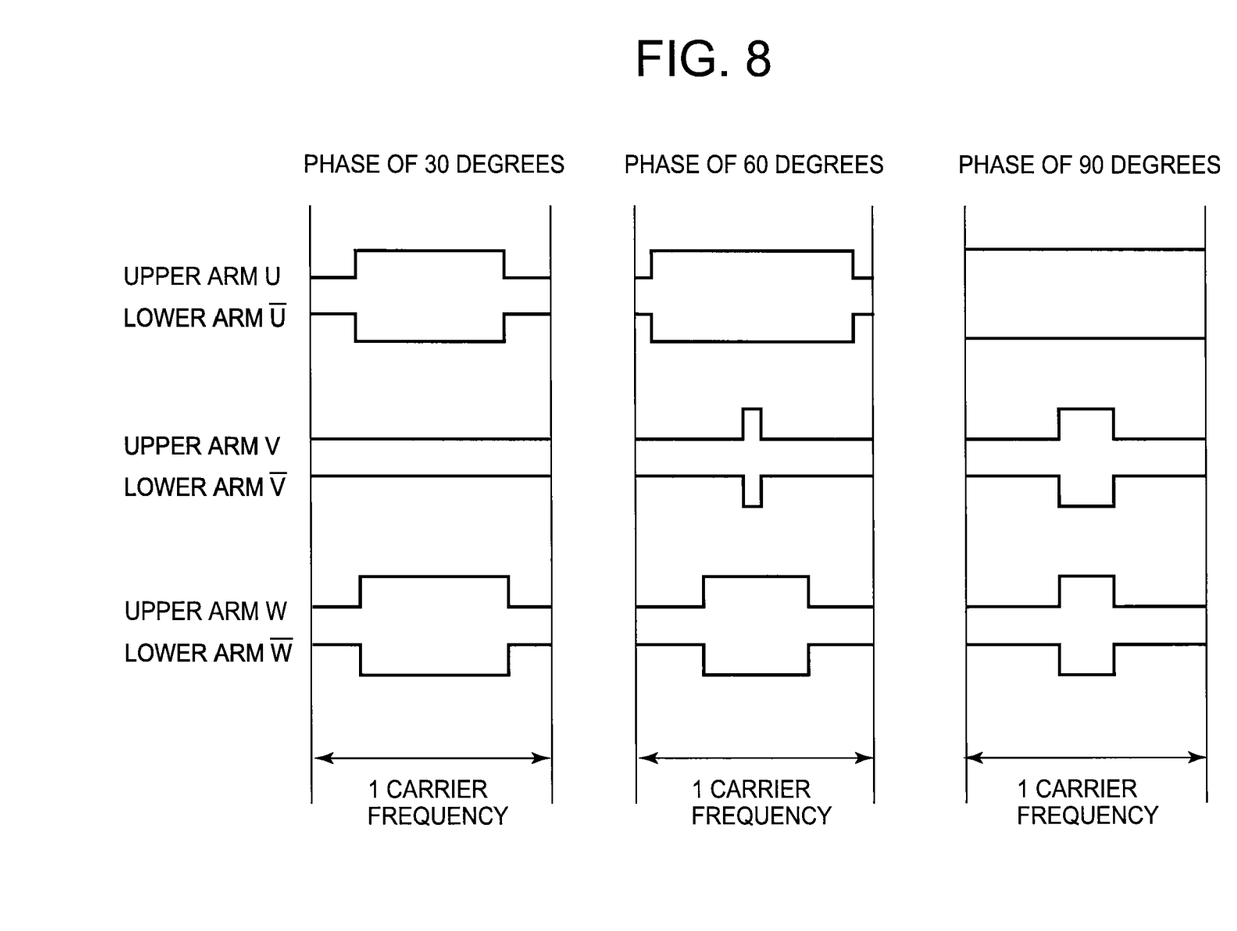
FIG. 8 shows the on/off state of each switching element in one carrier frequency of the inverter device of FIG. 1.

On the other hand, FIG. 8 shows the on/off state of each switching element of FIG. 1 in one cycle (one carrier frequency) of a carrier wave in the inverter device 200 of the above 2-shunt system. In FIG. 8, the left shows the on/off state of each switching element at a phase of 30°, the middle shows that at a phase of 60°, and the right shows that at a phase of 90°.

As seen from FIG. 8, in a high load state with a duty of 100%, a switching element 8u of a lower arm for a U-phase at the phase of 90° turns off in the whole region of one carrier frequency, and hence a U-phase current Iu cannot be detected around the phase of 90°. Similarly, a V-phase current Iv cannot be detected around a phase of 210°, and a W-phase current Iw cannot be detected around a phase of 330°. This is not limited to the duty of 100%, but similarly occurs with values close to 100% (e.g., values of 85% to 95% or more).

Figure 9:
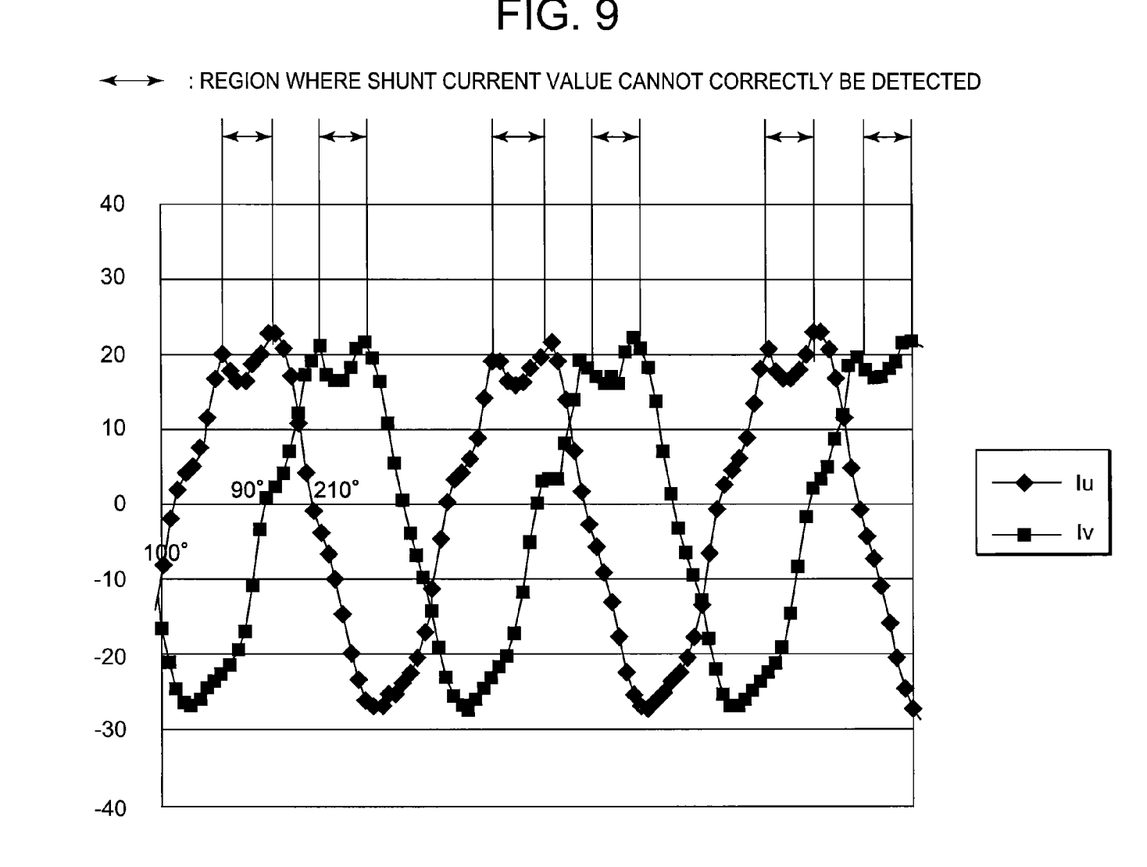
FIG. 9 is a diagram showing detected current waveforms of shunt resistors in a 2-shunt system of FIG. 1.

FIG. 9 is a diagram showing that a U-phase current Iu and a V-phase current Iv actually flowing through shunt resistors are detected in a 2-shunt system. It is seen that any correct current value of the U-phase current Iu cannot be detected around a phase of 90° and that any correct current value of the V-phase current Iv cannot be detected around a phase of 210°. Even after this phase, any correct current value cannot be detected similarly.

In this way, any current cannot be detected at a specific phase in the detection system of the phase current by use of the shunt resistor, and hence in, for example, the 1-shunt system, a method of increasing or decreasing the on-period of a part of the phases to detect the current or a method of estimating the phase current which cannot be detected is employed (see Patent Document 1).

Moreover, in the 2-shunt system, since two specific phases can only be detected, it becomes necessary to dispose shunt resistors for all the three phases, thereby changing the phase to be detected, and A/D conversion becomes complicated. Moreover, a problem occurs that the number of resistor components increases to increase generated heat (see, e.g., Patent Document 2).

The present invention has been developed to solve such conventional technical problems, and an object thereof is to realize accurate sensorless vector control without increasing shunt resistors in the above 2-shunt system.

According to a first aspect of the invention, there is provided an inverter device comprising: an inverter main circuit obtained by connecting, in a three-phase bridge-like manner, three arms formed by coupling, in series with a direct-current power source, two switching elements which perform mutually opposite on/off operations, to apply three-phase pseudo alternating-current voltages of a three-phase PWM system to an electric motor; shunt resistors connected to the direct-current power source in series with at least two of the three arms of the inverter main circuit; and control means for detecting currents flowing through the shunt resistors in a predetermined cycle to control the on/off operations of the switching elements of the inverter main circuit based on the detected currents, wherein the control means converts, into the current value of a specific angle range, a current value detected at a time before approximately 180° corresponding to the specific angle range where the on-time of the switching element is continuously not more than a predetermined value, and then uses the converted current value.

According to a second aspect of the invention, there is provided an inverter device comprising: an inverter main circuit obtained by connecting, in a three-phase bridge-like manner, three arms formed by coupling, in series with a direct-current power source, two switching elements which perform mutually opposite on/off operations, to apply three-phase pseudo alternating-current voltages of a three-phase PWM system to an electric motor; shunt resistors connected to the direct-current power source in series with at least two of the three arms of the inverter main circuit; and control means for detecting currents flowing through the shunt resistors in a predetermined cycle to control the on/off operations of the switching elements of the inverter main circuit based on the detected currents, wherein the control means calculates the existing current value from values of the currents flowing through the plurality of shunt resistors in the vicinity of a time before approximately 180° corresponding to a specific angle range where the on-time of the switching element is continuously not more than a predetermined value, and the control means converts the calculated value into the current value of the specific angle range and then uses the converted current value.

According to the present invention, when it is judged that any correct current value cannot be detected from a voltage command value, there is used, as the existing current value, the current value having a reverse polarity and an equal or substantially equal absolute value, e.g., the current value of the phase before approximately 180° among the previously detected current values, whereby in a so-called 2-shunt system, accurate sensorless vector control can be realized without further increasing the shunt resistors.

Furthermore, as in the second aspect of the invention, the existing current value is calculated from the plurality of current values in the vicinity of the time before approximately 180°, whereby the existing current value can more correctly be obtained.

BRIEF DESCRIPTION OF THE DRAWINGS

FIG. 4(a) is a constitution diagram of a storage memory of a specific phase current, and (b) is a flow chart for explaining step S3 of FIG. 3;

DESCRIPTION OF REFERENCE NUMERALS 1 inverter device
3 inverter main circuit
4 direct-current power source portion
6 electric motor
7u, 8u, 7v, 8v, 7w and 8w switching element
11 and 12 shunt resistor
13 controller

DETAILED DESCRIPTION OF THE PREFERRED EMBODIMENT

Figure 2:
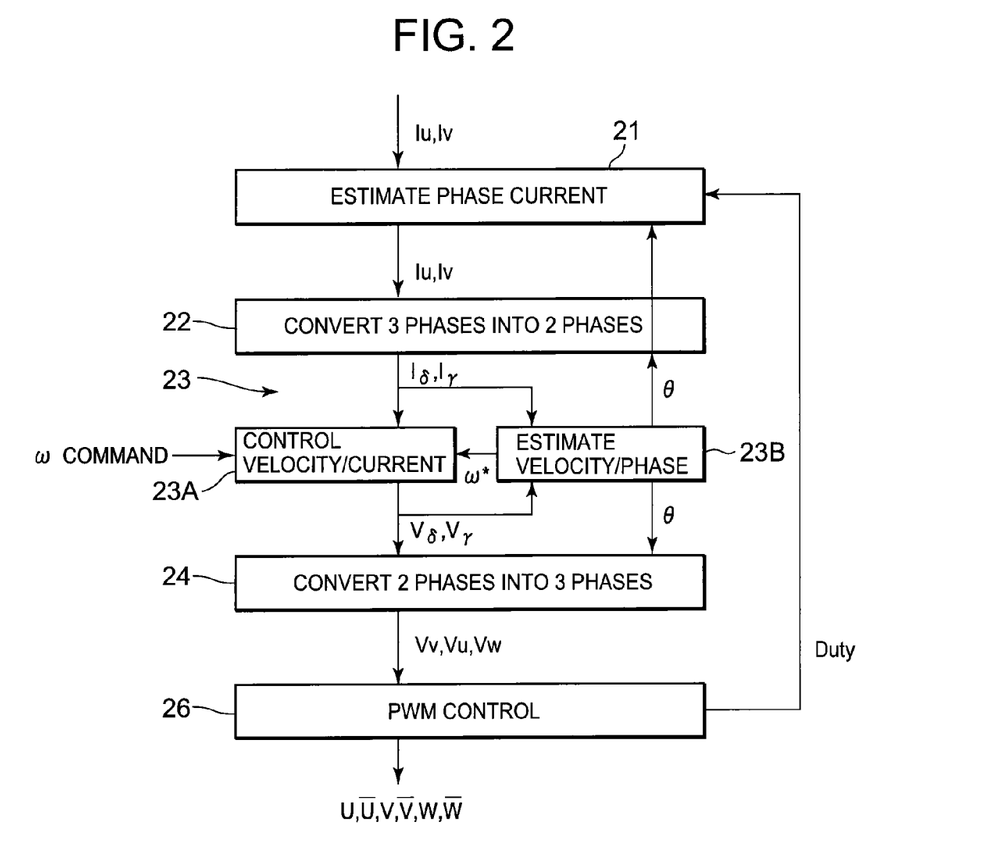
FIG. 2 is a functional block diagram of a controller in the inverter device of FIG. 1.

Hereinafter, an embodiment of the present invention will be described in detail with reference to the drawings. An inverter device 1 of the embodiment drives, for example, a compressor motor of a car air conditioner, and has a circuit constitution similar to that of FIG. 1. Moreover, FIG. 2 is a functional block diagram of a controller (control means) 13 of FIG. 1.

The constitution will be described anew with reference to FIG. 1. Reference numeral 3 is an inverter main circuit of a three-phase pulse width modulation (PWM) system where a voltage supplied from a direct-current power source section 4 is converted into arbitrary variable voltages, e.g., three-phase pseudo alternating-current voltages having a variable frequency, output, and supplied to an electric motor (e.g., a synchronous motor) 6. In the sensorless vector control of the electric motor 6, a current is supplied through two coils among three-phase (a U-phase, a V-phase and a W-phase) coils, the coil to be energized is switched at electric angles of 60 degrees, and an induced voltage is detected from a non-energized open phase, to detect the zero crossing timing of the phase, whereby the position of a rotor can be detected every 60 degrees. In, for example, a zone where the U and V-phases are energized, it is possible to detect the zero crossing of the W-phase which is the open phase.

The inverter main circuit 3 comprises a switching element 7u of an upper arm for the U-phase, a switching element 8u of a lower arm for the U-phase, a switching element 7v of an upper arm for the V-phase, a switching element 8v of a lower arm for the V-phase, a switching element 7w of an upper arm for the W-phase and a switching element 8w of a lower arm for the W-phase, and a diode which allows the return of a current flowing through a winding wire of the electric motor 6 is connected in anti-parallel with each of the switching elements 7u, 8u, 7v, 8v, 7w and 8w.

The switching elements 7u, 8u, 7v, 8v, 7w and 8w turn on when a pulse signal input into a base has an 'H' level, and turn off when the pulse signal has an 'L' level. Moreover, in this case, shunt resistors 11 and 12 are connected to the lower arm for the U-phase and the lower arm for the V-phase, respectively, the shunt resistor 11 has a constitution through which a U-phase current Iu flows, and the shunt resistor 12 has a constitution through which a V-phase current Iv flows.

Next, the controller 13 will be described with reference to FIG. 2. In this case, the controller is constituted of a current detecting section 21, a current converting section 22, a control section 23, a voltage converting section 24, a PWM control section 26 and the like. The current detecting section 21 detects the U-phase current Iu flowing through the shunt resistor 11 and detects the V-phase current Iv flowing through the shunt resistor 12 in a prescribed cycle. Moreover, as described above, the sum of the U-phase current Iu, the V-phase current Iv and a W-phase current Iw is zero, and accordingly, the W-phase current Iw is estimated (a 2-shunt system).

The current converting section 22 converts the three-phase currents Iu, Iv and Iw into currents Iδ and Iγ of a rotating coordinate (γ-δ) system based on a phase θ of the inverter main circuit 3 of the three-phase PWM system. The rotating coordinate (γ-δ) system is a γ-δ axis (a control axis) described in Patent Document 3, i.e., an orthogonal coordinate system where a rotor rotates with the estimated angular frequency value of a rotating magnetic field.

The control section 23 is constituted of a velocity/current control portion 23A and a velocity/phase estimating portion 23B. The velocity/current control portion 23A calculates voltage command values Vδ and Vγ of the rotating coordinate system of the inverter main circuit 3 of the three-phase PWM system based on an angular frequency command value ω of the rotor input from the outside and the currents Iδ and Iγ of the rotating coordinate system output from the current converting section 22. Moreover, the velocity/phase estimating portion 23B calculates an estimated angular frequency value ω* and phase θ of the inverter main circuit 3 of the three-phase PWM system based on the currents Iδ and Iγ and voltage command values Vδ and Vγ of the rotating coordinate system. The basic processing of the control section 23 is similar to that described in Patent Document 3.

As described above, when the voltage command value indicates a high load state with a duty of 100% in the 2-shunt system, as shown in FIG. 8, the switching element 8u of the lower arm for the U-phase turns off in the whole region of one carrier frequency at a phase of 90°, and hence the U-phase current Iu cannot be detected around the phase of 90°. Similarly, the V-phase current Iv cannot be detected around a phase of 210°, and the W-phase current Iw cannot be detected around a phase of 330°.

On the other hand, the current value of the phase which is 180° before the existing phase has a polarity reverse to that of the existing current value, and is a substantially equal absolute value. Moreover, the current value in the vicinity of the phase before 180° has a polarity reverse to that of the existing current value, and is a substantially equal absolute value. Therefore, in the embodiment of the present invention, when the duty of voltage command values Vv, Vu and Vw described later exceeds a value H●Duty (e.g., 85%, or any value of 85% to 95%. Hereinafter, this also applies) which is slightly smaller than 100%, the current detecting section 21 does not detect the U-phase current Iu and the V-phase current Iv and does not estimate the W-phase current Iw. Moreover, the current detecting section 21 calculates the existing current value from the current value at or in the vicinity of the phase which is 180° before the existing phase.

Figure 5:
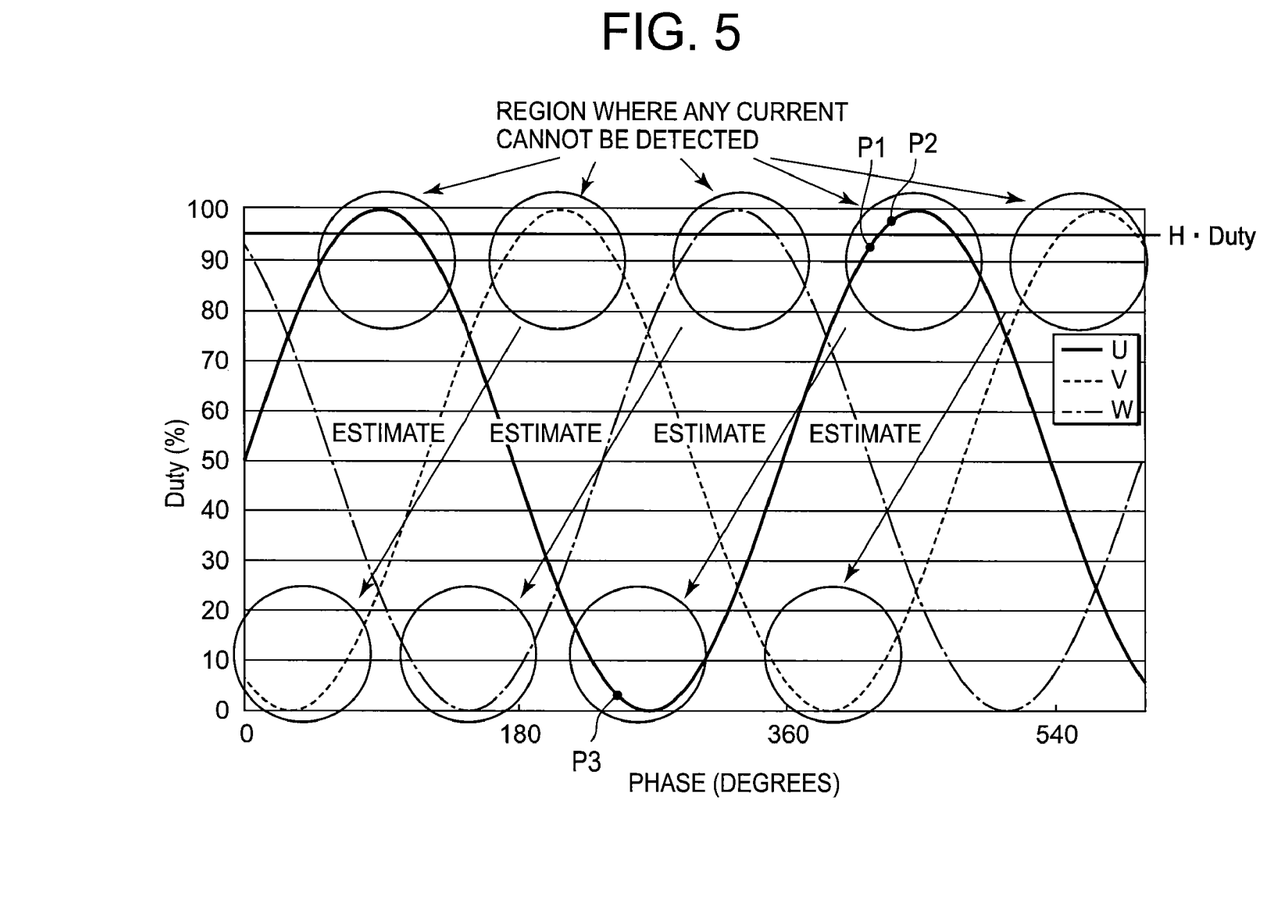
FIG. 5 is a characteristic diagram of the three-phase modulation of a voltage command value with a duty of 100%, and explains the operation of the controller of FIG. 2.

For example, when the duty of the voltage command value exceeds the value H●Duty in a phase P2 of FIG. 5, it is judged that the U-phase current Iu cannot be detected, the U-phase current Iu of a phase P3 (or in the vicinity of the phase) before 180° is employed, and it is estimated that the phase current Iu having a reversed polarity and an equal value is flowing. The V-phase current Iv and the W-phase current Iw are similarly employed.

In this case, the current detecting section 21 estimates that the estimated angular frequency value ω* estimated by the velocity/phase estimating portion 23B at the sampling time before the phase P2 is still equal at present (i.e., it is estimated that the rotor rotates at an equal velocity) and that the phase advances to the next sampling time at the angular frequency, to grasp the existing phase θ (P2). Moreover, the section specifies the phase P3 which is 180° before the phase P2 or the phase in the vicinity of the phase P3.

The current converting section 22 converts the estimated three-phase currents Iu, Iv and Iw into the currents Iδ and Iγ of the rotating coordinate (γ-δ) system based on the phase θ. Moreover, the velocity/current control portion 23A calculates the voltage command values Vδ and Vγ of the rotating coordinate system of the inverter main circuit 3 of the three-phase PWM system based on the angular frequency command value ω of the rotor input from the outside and the currents Iδ and Iγ of the rotating coordinate system output from the current converting section 22. Furthermore, the velocity/phase estimating portion 23B calculates the estimated angular frequency value ω* and phase θ of the inverter main circuit 3 of the three-phase PWM system based on the currents Iδ and Iγ and voltage command values Vδ and Vγ of the rotating coordinate system.

The voltage converting section 24 converts the voltage command values Vδ and Vγ of the rotating coordinate system into three-phase voltage command values, i.e., the U-phase voltage command value Vu, the V-phase voltage command value Vv and the W-phase voltage command value Vw based on the phase θ of the inverter main circuit 3 of the three-phase PWM system.

The PWM control section 26 subjects the three-phase voltage command values Vu, Vv and Vw to pulse width modulation (duty), and outputs pulse signals U, Ubar, V, Vbar, W and Wbar which control the switching elements 7u, 8u, 7v, 8v, 7w and 8w, respectively.

Figure 3:
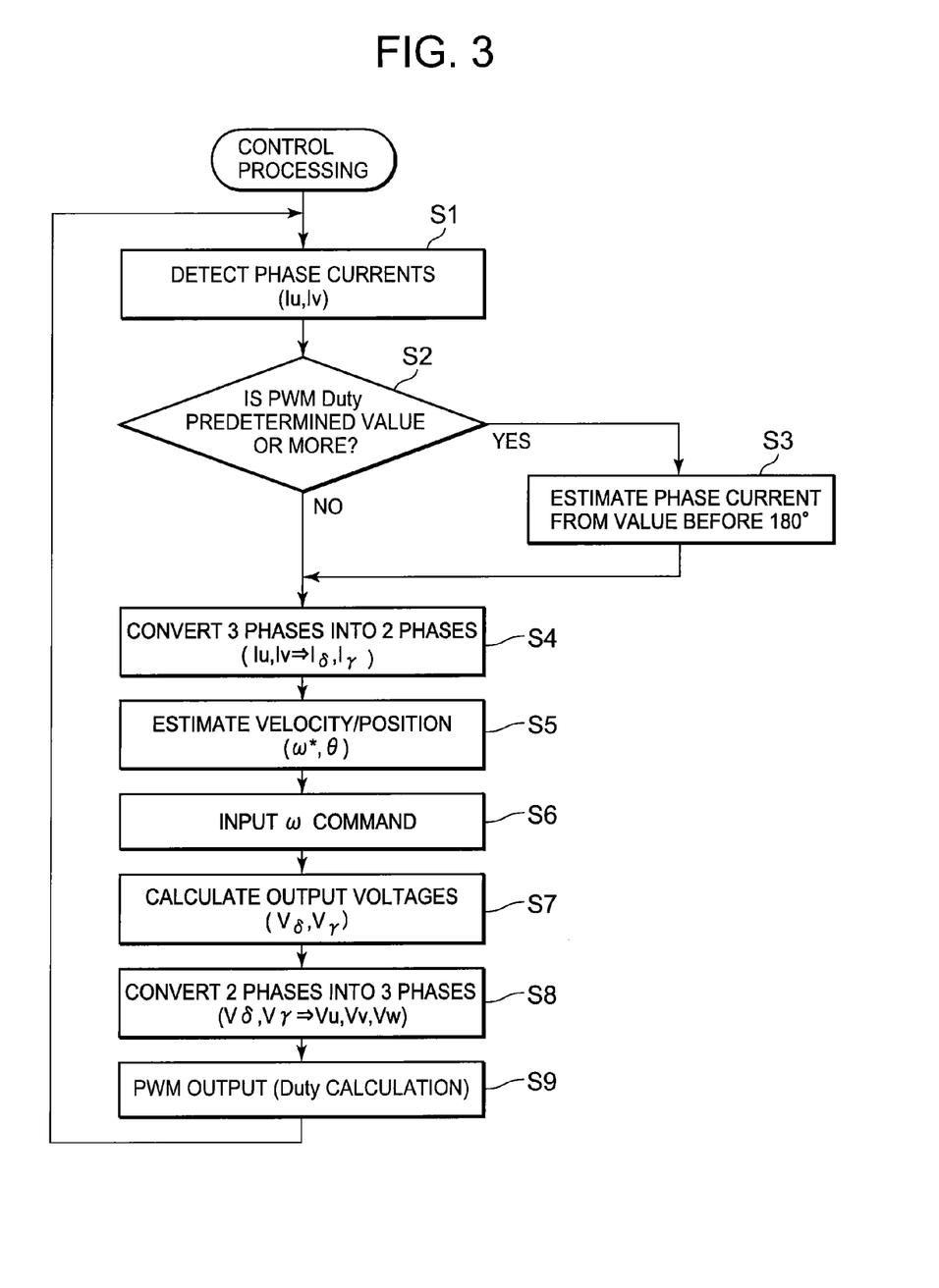
FIG. 3 is a flow chart for explaining the operation of the controller of FIG. 2.

FIG. 3 is a flow chart of the controller 13 showing the above operation. That is, in step S1, the current detecting section 21 detects the U-phase current Iu flowing through the shunt resistor 11 and the V-phase current Iv flowing through the shunt resistor 12 in a prescribed cycle. Moreover, as described above, since the sum of the U-phase current Iu, the V-phase current Iv and the W-phase current Iw is zero, the W-phase current Iw is estimated.

Next, the current detecting section 21 judges, in step S2, whether or not the PWM duty of the voltage command values Vv, Vu and Vw is a predetermined value H●Duty (85% as described above) or more. When the duty is smaller than H●Duty, the processing advances to step S4. When the duty is not less than H●Duty, the processing advances to step S3.

In the step S3, the current detecting section 21 calculates the existing U-phase current Iu, V-phase current Iv and W-phase current Iw from the current value at or in the vicinity of the phase which is 180° before the existing phase. In this case, the current value at or in the vicinity of the phase before 180° is employed, and it is estimated that the current having the reversed polarity and the equal value is flowing.

Figure 4:
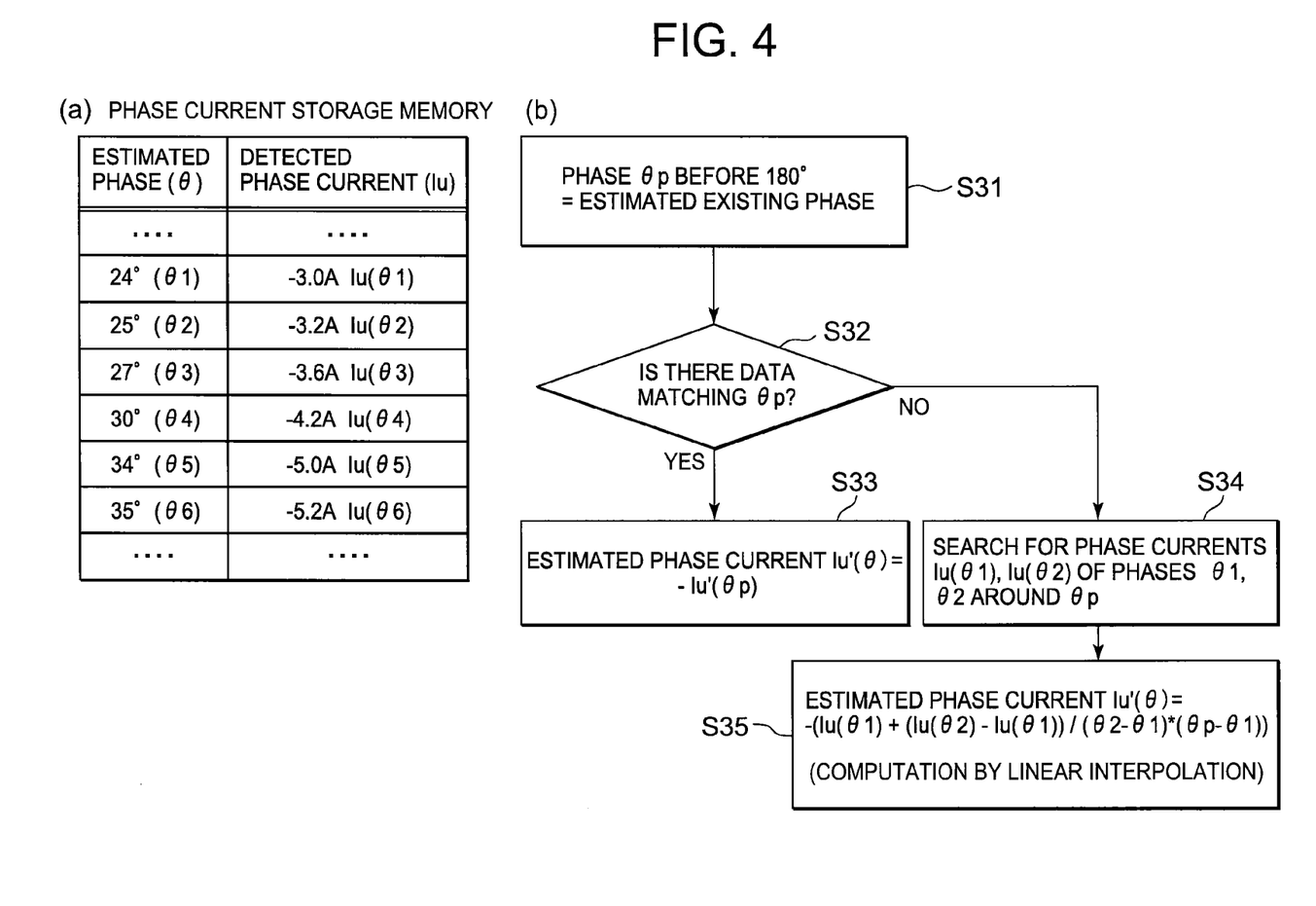

Specifically, a phase current storage memory in which each phase current is stored is provided in the controller 13. As shown in FIG. 4(a), pairs of estimated angles of the rotor of the electric motor 6 and detected phase currents are stored in the phase current storage memory, and the data is overwritten in accordance with the rotation of the electric motor 6 and is successively rewritten.

In step S31 of FIG. 4(b), the controller 13 obtains an angle θp which is 180° before the existing estimated angle θ. It is judged in step S32 whether or not the estimated angle θ which matches the angle θp is stored in the phase current storage memory.

If the matching angle is stored, a detected phase current·Iu (θp) corresponding to the angle is obtained as an estimated phase current Iu' (θ).

On the other hand, if any matching angle is not stored, in step S34, detected phase currents Iu (θ1) and Iu (θ2) corresponding to angles around the angle θp are searched and read from the phase current storage memory.

In step S35, linear interpolating computation is performed to finally obtain the estimated phase current Iu' (θ) based on the values of the detected phase currents obtained in the step S34.

Next, the processing advances to the step S4 in which the current converting section 22 converts the three-phase currents Iu, Iv and Iw into the currents Iδ and Iγ of the rotating coordinate (γ-δ) system based on the phase θ of the inverter main circuit 3 of the three-phase PWM system.

Next, the processing advances to step S5 in which the velocity/phase estimating portion 23B of the control section 23 calculates the estimated angular frequency value ω* and phase θ of the inverter main circuit 3 of the three-phase PWM system based on the currents Iδ and Iγ and voltage command values Vδ and Vγ of the rotating coordinate system.

Next, the velocity/current control portion 23A of the control section 23, in step S6, inputs the angular frequency command value ω of the rotor input from the outside, and in step S7, calculates the voltage command values Vδ and Vγ of the rotating coordinate system of the inverter main circuit 3 of the three-phase PWM system based on the currents Iδ and Iγ of the rotating coordinate system output from the current converting section 22.

Next, in step S8, the voltage converting section 24 converts the voltage command values Vδ and Vγ of the rotating coordinate system into the three-phase voltage current values, i.e., the U-phase voltage command value Vu, the V-phase voltage command value Vv and the W-phase voltage command value Vw based on the phase θ of the inverter main circuit 3 of the three-phase PWM system.

Next, in step S9, the PWM control section 26 subjects the three-phase voltage command values Vu, Vv and Vw to the pulse width modulation (duty), and outputs the pulse signals U, Ubar, V, Vbar, W and Wbar which control the switching elements 7u, 8u, 7v, 8v, 7w and 8w, respectively.

In this way, when the controller 13 judges that any current value cannot be detected from the voltage command value, the controller calculates the existing current value from the current value at the phase before 180° or in the vicinity of the phase before 180° among the previously detected current values, i.e., the current value having the polarity reverse to that of the existing current and an equal or substantially equal absolute value. In consequence, accurate sensorless vector control can be realized without further increasing shunt resistors in the so-called 2-shunt system.

Especially, it is estimated that the estimated angular frequency value calculated at the previous sampling time is still equal at present, to estimate the existing phase, whereby an operation of specifying the previous phase can accurately be performed.

It is to be noted that in the above embodiment, the existing current value is calculated from the current value at the phase before 180° or in the vicinity of the phase, but the present invention is not limited to this embodiment. For example, the existing current value may be calculated in accordance with a predetermined calculating equation (computation) based on current values at two phases before and after the phase before 180°, or a plurality of current values at the phase before 180° and in the vicinity of the phase. In this case, the existing current value can more correctly be estimated.

What is claimed is:

1. An inverter device comprising:

an inverter main circuit obtained by connecting, in a three-phase bridge-like manner, three arms formed by coupling, in series with a direct-current power source, two switching elements which perform mutually opposite on/off operations, to apply three-phase pseudo alternating-current voltages of a three-phase PWM system to an electric motor;

shunt resistors connected to the direct-current power source in series with at least two of the three arms of the inverter main circuit; and control means for detecting currents flowing through the shunt resistors in a predetermined cycle to control the on/off operations of the switching elements of the inverter main circuit based on the detected currents, wherein the control means determines if the on-time of the switching element is continuously not more than a predetermined value, and if the control means determines that the on-time of the switching element is not more than a predetermined value, the control means converts, into the current value of a specific angle range, a current value detected at a time before approximately 180° corresponding to the specific angle range and then uses the converted current value.

2. An inverter device comprising:

an inverter main circuit obtained by connecting, in a three-phase bridge-like manner, three arms formed by coupling, in series with a direct-current power source, two switching elements which perform mutually opposite on/off operations, to apply three-phase pseudo alternating-current voltages of a three-phase PWM system to an electric motor;

shunt resistors connected to the direct-current power source in series with at least two of the three arms of the inverter main circuit; and control means for detecting currents flowing through the shunt resistors in a predetermined cycle to control the on/off operations of the switching elements of the inverter main circuit based on the detected currents, wherein the control means determines if the on-time of the switching elements is continuously not more than a predetermined value, and if the determination of the control means is that the switching elements are not continuously on for more than a predetermined value, said control means calculates the existing current value from values of the currents flowing through the plurality of shunt resistors in the vicinity of a time before approximately 180° corresponding to a specific angle range, and converts the calculated value into the current value of the specific angle range and then uses the converted current value.

* * * * *